(12) United States Patent
Fowler et al.

(10) Patent No.: US 6,512,992 B1
(45) Date of Patent: Jan. 28, 2003

(54) IRRIGATION POSITIONING SYSTEM

(75) Inventors: Clarence W. Fowler, Elgin, TX (US);
Gerald D. Powell, Austin, TX (US);
David A. Fowler, Elgin, TX (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 09/263,982

(22) Filed: Mar. 5, 1999

(51) Int. Cl.$^7$ ............................ G01C 19/18; G06F 7/00
(52) U.S. Cl. ........................ 702/150; 702/155; 701/50
(58) Field of Search ............................ 702/150, 2, 155, 702/158; 239/729, 63, 542, 11, 726, 728, 731; 700/284; 342/357.12; 73/314; 701/50; 405/118, 35; 116/209, 226

(56) References Cited

U.S. PATENT DOCUMENTS

| | | | |
|---|---|---|---|
| 3,979,062 A | * 9/1976 | Christensen et al. | 239/11 |
| 4,202,596 A | * 5/1980 | Knudsen | 239/728 |
| 4,580,731 A | * 4/1986 | Kegel et al. | 239/731 |
| 4,662,563 A | 5/1987 | Wolfe, Jr. | 239/1 |
| 5,246,164 A | * 9/1993 | McCann et al. | 239/11 |
| 5,341,995 A | * 8/1994 | Leatch | 239/729 |
| 5,613,641 A | * 3/1997 | Grothen | 239/731 |
| 5,740,038 A | * 4/1998 | Hergert | 700/284 |
| 5,927,603 A | * 7/1999 | McNabb | 239/63 |
| 5,986,604 A | * 11/1999 | Nichols et al. | 342/357.12 |
| 5,991,694 A | * 11/1999 | Gudat et al. | 702/2 |
| 6,095,439 A | * 8/2000 | Segal et al. | 239/729 |
| 6,108,590 A | * 8/2000 | Hergert | 700/284 |
| 6,199,000 B1 | * 3/2001 | Keller et al. | 701/50 |

OTHER PUBLICATIONS

"Center Pivot Irrigation System," *Agro Technocrafts*, www-.pakmart.com/atc/atc1.htm#CPI Introduction, Feb. 24, 199.
David Fowler, "A Simple Description of How Real–Time DGPS Works," http://vancouver-webpages.com/peter/dgpsinfo.txt, Feb. 24, 1999.
"The GPS (How it Works)," www.nautilia.com/mag/dossiers/9805/en/gps01.html, Feb. 22, 1999.
"Differential GPS," www.trimble.com/gps/diffGPS/aa$_{13}$dg3.htm, Feb. 24, 1999.

* cited by examiner

*Primary Examiner*—Bryan Bui
(74) *Attorney, Agent, or Firm*—Altera Law Group, LLC

(57) ABSTRACT

A means of accurately determining the position of a selected location such as at the end of a center-pivot irrigation system by using two Global Positioning System (GPS) receivers. The first GPS receiver is located at a fixed, known position such as at the center of the pivoting irrigation system while the second GPS receiver is located on a moving portion of the irrigation system. The first GPS receiver compares the GPS receiver reported position against the actual position and reports by wire or radio link the position differences to the second GPS, where the differences are used to remove errors from the second receiver's measured position.

20 Claims, 3 Drawing Sheets

IRRIGATION POSITIONING SYSTEM

1. TECHNICAL FIELD

The present invention relates generally to positioning systems for automated irrigation systems. In particular, the present invention relates to an improved position sensing system in a center pivot irrigation system.

2. BACKGROUND

Knowing (or being able to calculate) the position of each spray head along the conduit assembly of a center pivot irrigation ("CPI") system is important for the precision delivery of water, fertilizer, herbicides, and pesticides. In fact, systems that control the delivery of liquids along the length (or conduit assembly) of the CPI system can require an accuracy of 3 meters or better to be effective.

Present methods of determining spray head positions such as by tracking the end of the conduit assembly include the, for example, the use of a flux-gate magnetic compass to derive angular bearing and by knowing the distance from the center to end allows the position at all points along the irrigation system to be known. Unfortunately, however, errors in the magnetic compass can exceed the system tolerances because electric current used to drive the wheel motors can cause errors in compass measurements and require expensive calibration at installation.

Another technique involves using a wheel counter that measures the rotations of a wheel located at the end of the pivot. Unfortunately, with this technique, the wheel location system can suffer from a build up of errors due to slippage and mud buildup causing an apparent wheel diameter error.

Accordingly, what is needed is an improved positioning system and method for irrigation systems including center pivot irrigation systems.

3. SUMMARY OF THE INVENTION

The present invention provides an improved positioning system by using differential global positioning system ("DGPS") methods to monitor (or track) the absolute and/or relative position of a selected location on the conduit assembly referenced from the fixed, known position of a central tower. In one embodiment, a first global positioning system ("GPS") receiver mounted at the fixed tower generates differential correction information and provides this correction information via wire or otherwise to a second GPS receiver mounted at a selected location on the conduit assembly of the irrigation assembly.

In another more particular embodiment of the present invention, the positioning system is made up of two GPS receivers, the first of which is programmed to generate differential corrections and is installed at the center of a pivot irrigation assembly, where it does not move. The second GPS receiver is installed at or near the moving end of the pivot irrigation assembly and is connected by twisted shielded wire to the first GPS receiver. The second GPS receiver receives the differential corrections from the first GPS receiver over the wire and generates corrected GPS position information. The position information enters a microprocessor system where distance and bearing are computed, averaged and reported, e.g., once every 30 seconds, to a central, controller for the irrigation system.

4. BRIEF DESCRIPTION OF THE DRAWINGS

5. DETAILED DESCRIPTION

5.1 Overview

Figure 1:
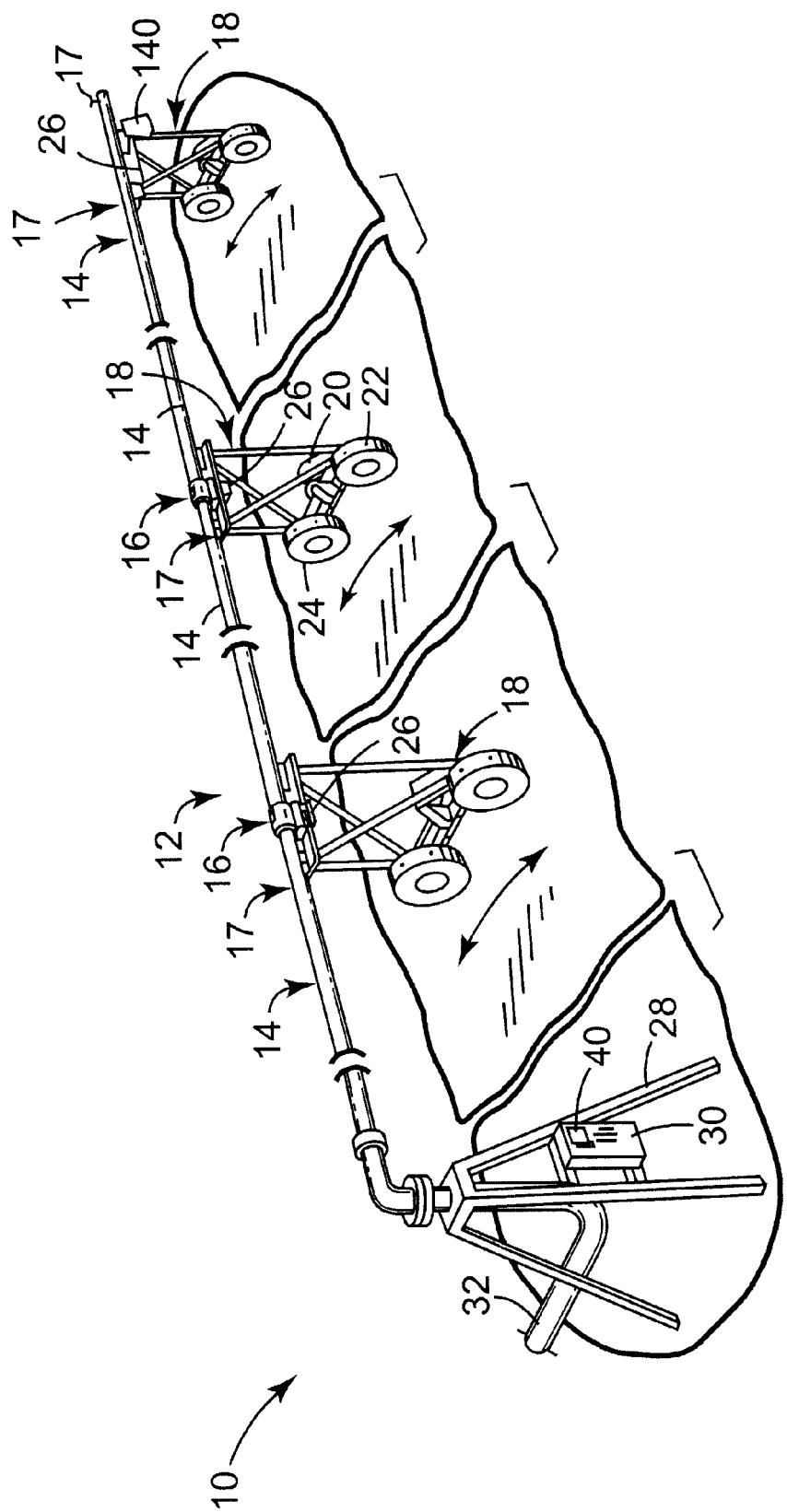
FIG. 1 is a perspective view of an irrigation system with a positioning system of the present invention.
Figure 2:
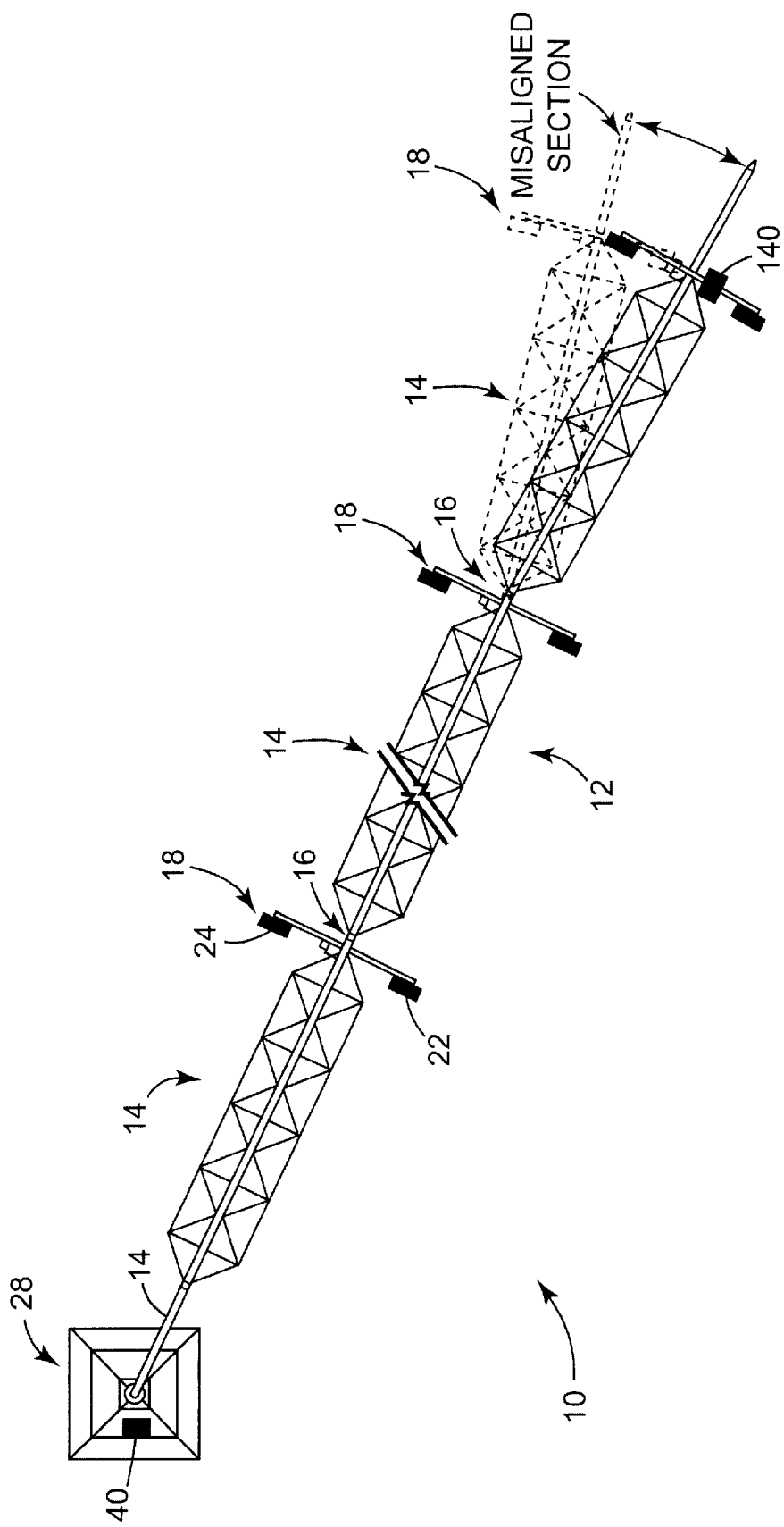
FIG. 2 shows a top view of an, irrigation system having a positioning system of the present invention.

With reference to FIGS. 1 and 2, a center pivot type irrigation system 10 is shown. System 10 generally includes a conduit assembly 12 pivotally mounted to a central pivot tower 28. Conduit assembly 12 includes a plurality of conduit sections 14, which are pivotally jointed at adjacent ends by couplings 16, which are supported by self-propelled carriages 18. Conduit assembly 12 also includes spray heads 17 distributively mounted along conduit sections 14 for selectively applying water and chemical applications onto a field. Each carriage 18 includes a selectively and reversibly operable motor 20, which is drivingly attached to a pair of wheels 22, 24 for driving conduit assembly 12 about the central pivot tower 28. Each carriage 18 also includes carriage control module 26 for controlling motor 20.

The central pivot tower 28 typically includes a central control box 30 for providing power to the individual control modules 26. Central tower 28 also includes a water supply inlet conduit section 32 for transferring pressurized water (or chemical applications) to the conduit assembly 12 for controlled distribution as the conduit sections 14 travel about tower 28.

Irrigation system 10 also includes a central controller (not shown), a first DGPS receiver assembly 40, and a second DGPS receiver assembly 140. The central controller controls the overall operation of the irrigation system 10. In the depicted embodiment, the central controller is housed in the central control box 30 and may be implemented with any suitable processor system such as a computer or a microprocessor/controller based system. The first DGPS receiver assembly 40 is mounted to the central pivot tower 28, which has a known position. The second DGPS receiver assembly 140 is mounted at a selected location of the conduit assembly 12 (e.g., at its end). The second DGPS receiver is also connected to the central controller for providing it with position information for the selected location. The first and second DGPS receivers are communicatively connected through a communication link 90 (FIG. 3) and make up a positioning system (which will be discussed in greater detail below) for irrigation system 10.

In operation, in one embodiment, the central controller performs two basic functions. First, it controls the rotation of conduit assembly 12 about central pivot tower 28. Second, it controls the emission of water (and other liquid treatments including fertilizers, herbicides, and pesticides) through spray heads 17. These two functions are controlled together for the implementation of an overall application plan that allows different amounts of application to be applied to different regions of a field For example, certain areas may require more or less water than others due to variances in soil consistency. For the central controller to successfully execute such a plan, it should have accurate position information for the location of the conduit assembly 12 at any given time. This position information may either be absolute or relative to the position of the central pivot tower 28.

The second DGPS receiver assembly 140 provides the central controller with this position information. In one embodiment, the position information is reported in polar coordinates, that is, the selected location's bearing (angular displacement from a predetermined line of reference, e.g., with respect to North) and distance from the central pivot tower 28. The distance and bearing information define the position of the conduit assembly 12 and accordingly, the calculatable positions of the individual spray heads 17. The distance of the selected location from the central pivot tower 28 may also be independently used for other purposes such as monitoring the alignment of the conduit assembly 12 (i.e., ensuring that the reported distance is acceptably close to the straight-line length of conduit assembly 12).

5.2 DGPS System

Figure 3:
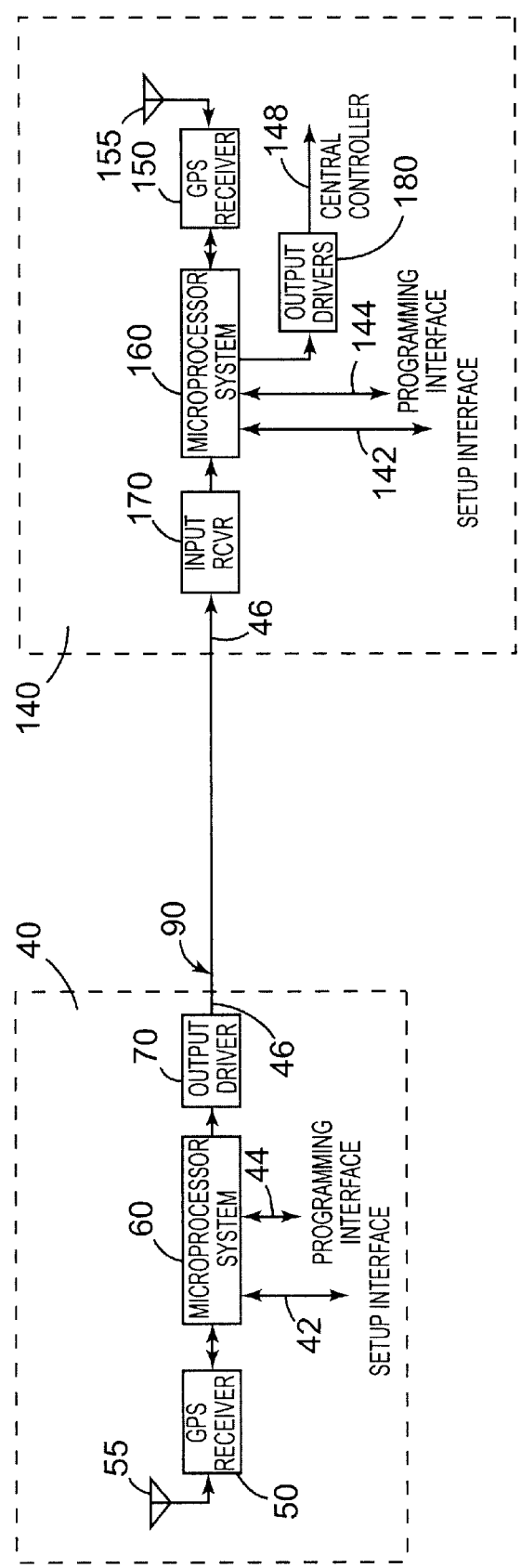
FIG. 3 shows a block diagram of one embodiment of a positioning system of the present invention.

FIG. 3 shows a block diagram of one embodiment of a positioning system for irrigation system 10. This positioning system includes a first DGPS receiver assembly 40 communicatively connected to a second DGPS receiver assembly 140 through communications link 90.

In the depicted embodiment, the first DGPS receiver assembly 40 includes a first GPS receiver 50 operatively connected to a microprocessor system 60, which in turn is operatively connected to an output driver 70. The GPS receiver 50 has an antenna 55 for receiving GPS satellite signals. The first DGPS receiver assembly 40 also has an external set-up interface 42 and an external programming interface 44 for communicating (receiving/transmitting) set-up and programming information, respectively, with an external source (e.g., a personal computer). In the depicted embodiment, microprocessor system 60 directly communicates with the set-up and programming interfaces 42, 44. The first DGPS receiver assembly 40 also includes a DGPS output 46 for providing differential correction information to the second DGPS receiver assembly 140. In the depicted embodiment, output driver 70 outputs the position correction information through the DGPS output 46.

The second DGPS receiver assembly 140 includes second GPS receiver 150 operatively connected to microprocessor system 160, which in turn is operatively connected to an input receiver 170 and an output driver 180. The second GPS receiver 150 includes an antenna 155 for receiving GPS satellite signals. The second DGPS receiver assembly 140 further includes set-up and programming interfaces 142, 144, respectively, connected through microprocessor system 160. The second DGPS receiver assembly 140 also has an input 146 at input receiver 170 for receiving the correction information from the first DGPS receiver assembly 40 and an output 148 at output driver 180 for providing the central controller with the position of the selected location of the second receiver assembly 140.

The first GPS receiver 40 may be any suitable device, either alone or in connection with microprocessor system 60, that can generate differential GPS correction information for the second GPS receiver 150. The first GPS receiver includes but is not limited to custom-designed DGPS receivers, modified GPS receivers, and conventional DGPS receivers such as the Motorola VP-ONCORE™ receiver. Likewise, the second GPS receiver may be any suitable device, either alone or in connection with microprocessor system 160, that can generate corrected position information based on received GPS signals and the received position correction information from the first DGPS receiver assembly 140. Similarly, the second GPS receiver includes but is not limited to custom-designed DGPS receivers, modified conventional GPS receivers, and conventional DGPS receivers such as the Motorola ONCORE™ receiver.

The microprocessor systems 60, 160 may be implemented with conventional microprocessor system techniques that allow the microprocessor systems to perform their various functions. Such systems could include any suitable processing device such as a microprocessor, a microcontroller, a computer, an/or a combination of functionally-equivalent discrete circuit elements.

The output drivers 70, 180 and input receiver 170 in connection with the communications link 90 may be implemented with suitable devices or circuitry for transmitting and receiving differential correction and corrected position signals, respectively. In one embodiment, the communications link 90 comprises a twisted pair of wires connecting output driver 70 and input receiver 170, which are implemented with an RS485 driver and an RS485 receiver, respectively. With this embodiment, driver output 180 may also be implemented with an RS485 driver.

In operation, the first GPS receiver 50, which in the depicted embodiment is located at the center of the central pivot tower 28, may average multiple position measurements taken at different times or it can simply be provided with its known, absolute position. The first GPS receiver 150 (and/or the microprocessor system 160) then computes differential corrections and communicates these corrections through microprocessor system 60 to driver output 70 (e.g., standard RS485 wire interface) to the second GPS receiver 150 through driver receiver 170 and microprocessor system 160. The second GPS receiver 150 generates differentially corrected position data, which are input to the second microprocessor system 160. The second microprocessor system 160 (or the second GPS 150 itself), which has been given the absolute position of the first GPS receiver 50, then computes distance and bearing with respect to the central pivot tower 28. The second microprocessor system 160 also averages the position reports, which in one embodiment occur once per second, for a period that is determined by user requirements, in this case, 30 seconds. The averaging reduces the position noise caused by signal noise and noise due to wind and vibration. The averaged distance and bearing information is then sent to the central controller through output driver 180.

Set-up interfaces 42 and 142 are used to enter set-up information into the microprocessor systems 60 and 160, respectively. For example, set-up interface 42 may receive the position of the first GPS receiver 50. Programming interfaces 44 and 144 are used to load microprocessor program code into microprocessor systems 60 and 160, respectively. The microprocessor systems 60, 160 store the set-up data, which among other things, allows the DGPS receiver assemblies 40, 140 to recover after power outage without needing a back-up battery. Microprocessor systems 60, 160 may also convert into a suitable format (e.g., in conformance with the selected communications link 90) data received from and/or provided to the first and second GPS receivers 50, 150, respectively.

The first GPS receiver 50 and/or microprocessor system 60 may generate the correction information in any one of a variety of suitable ways. For example, in one embodiment, the first GPS receiver 50, because it knows the exact position of its antenna, knows what each satellite range measurement should be. It measures the ranges to each satellite using the received signals just as if it was going to calculate position. The measured ranges are subtracted from the known ranges and the result is range error. The range error values for each satellite are then continuously regenerated and transmitted to the second receiver 150 as correction information.

In another embodiment, instead of using the GPS timing signals to calculate its position (as would a normal GPS receiver), first receiver 40 uses its known position and the conventional GPS equations to calculate timing information. With this timing information, it knows what its received GPS timing signals should equal and compares these "correct" timing signals with those actually received from the GPS satellites. These timing errors are correction information, which can be sent to the second GPS receiver 150 as a correction information. The first receiver 50 can also generate and send to the second receiver 150 correction information for each satellite signal it receives because it doesn't necessarily know which satellites the second receiver 150 will be using.

5.3 Other Embodiments

It will be seen by those skilled in the art that various changes may be made without departing from the spirit and scope of the invention.

For example, persons of ordinary skill will recognize that the second DGPS receiver assembly 140 could be mounted at a selected location in various places along the conduit assembly other than at its end. In addition, the first GPS receiver would not have to be mounted at the central pivot tower; it could be mounted at any suitable reference location such as on nearby ground. Moreover, in another embodiment, the reference location need not even be known or fixed (stationary) as long as its distance is fixed with respect to the selected location.

In addition, communication link 90 could be implemented with conventional RF communication techniques. In one embodiment, the correction information could be formatted into messages, e.g., in the RTCM format and provided to a modulator and transmitter for transmission to a compatible receiver at the front-end of the second DGPS receiver assembly 140. The messages could be generated continuously.

Also, other differential techniques could include the first receiver's outputting position along with the specific satellites used to obtain these solutions to the microprocessor system, which could instruct the second receiver to use the same satellites to obtain its position solution. The microprocessor could then compute range and bearing with differential accuracy because position errors due to the ionosphere and the intentional signal degradation called Selective Availability would be common to both measurements which is the case with standard DGPS. This differential method would not necessarily yield accurate absolute position but would yield accurate distance and bearing measurements relative to the central pivot tower 28.

Moreover, within the context of the present invention, the positioning system can not only be used to track the conduit assembly's position, but also, it can be used to ensure that its alignment is proper. With the capability to precisely determine the distance, e.g., from the conduit assembly end to the center pivot tower, the central controller is capable of detecting the failure of, for example, a drive motor which can cause the conduit assembly to fold inward on itself thus reducing the distance to the end, which can be detected by the central controller. This type of failure can cause expensive damage to the pivot irrigation assembly.

Furthermore, the first DGPS receiver is not necessarily even required if a conventional DGPS receiver using differential corrections derived from correction sources such as the US Coast Guard radio beacons or commercial satellite based delivery systems is used alone as the second DGPS receiver. However, such an embodiment would not be preferred because these correction signals are not always available at all possible locations where center pivot systems are used. Also, position accuracy degrades as the distance of the second DGPS receiver from the correction signal transmitter increases. Other problems associated with the radio beacon are that signals suffer from outages at night if one is over 125 miles from the station and signal losses due to thunder storms if the system is operating in a fringe area.

Accordingly, the present invention is not limited to that which is expressly shown in the drawings and described in the specification.

We claim as follows:

1. An irrigation positioning system, comprising;
    a first receiver at a first fixed position with respect to a central tower of said system for generating position correction signals; and
    a second receiver mounted at a selectable second position on said system at a distance from said central tower for receiving said position correction signals and generating corrected position signals indicative of an extent of misalignment between a plurality of semi-rigidly connected sections of said system.
2. The system of claim 1, wherein said system comprises a plurality of reversible motors to enable align-able positioning of said connected sections.
3. The system of claim 2, wherein a failure of one or more of said motors is determinable from said position signals indicative of an extent of misalignment.
4. The system of claim 1, wherein said position signals are derived from a time-average of information signals averaged over a selectable time interval for minimizing errors in position determinations.
5. The system of claim 1, wherein said first receiver is a beacon receiver for receiving GPS corrections signals from a local beacon and wherein said second receiver is a GPS receiver for receiving signals from a GPS satellite system.
6. The system of claim 1, wherein said first receiver is a GPS receiver and said second receiver is a GPS receiver and said first receiver communicates to said second receiver the identity of satellites from which a position signal is derived by said first receiver to enable said second receiver to use said same satellites from which to derive position signals.
7. The system of claim 1, wherein said first receiver is a GPS receiver and said first receiver generates position correction information by comparison of a specified position of an antenna of said first receiver to the position derived by said first receiver from GPS satellite signals.
8. The system of claim 1, wherein said first receiver is a GPS receiver and said first receiver generates position correction information by comparison of timing information derived from a specified position of an antenna of said first receiver to separate timing information derived by said first receiver from GPS satellite signals.
9. A method for controlling an irrigation system, comprising;
    generating position correction signals obtained from a first receiver at a first fixed position with respect to a central tower of said system; and
    generating corrected position signals indicative of an extent of misalignment between a plurality of semi-rigidly connected sections of said system derived from said position correction signals and obtained from a second receiver mounted at a selectable second position on said system at a distance from said central tower.
10. The method of claim 9, wherein said system comprises a plurality of reversible motors to enable align-able positioning of said connected sections.

11. The method of claim 10, wherein a failure of one or more of said motors is determinable from said position signals indicative of an extent of misalignment.

12. The method of claim 9, wherein said position signals are derived from a time-average of information signals averaged over a selectable time interval for minimizing errors in position determinations.

13. The method of claim 9, wherein said first receiver is a beacon receiver for receiving GPS corrections signals from a local beacon and wherein said second receiver is a GPS receiver for receiving signals from a GPS satellite system.

14. The method of claim 9, wherein said first receiver is a GPS receiver and said second receiver is a GPS receiver and said first receiver communicates to said second receiver the identity of satellites from which a position signal is derived by said first receiver to enable said second receiver to use said same satellites from which to derive position signals.

15. The method of claim 9, wherein said first receiver is a GPS receiver and said first receiver generates position correction information by comparison of a specified position of an antenna of said first receiver to the position derived by said first receiver from GPS satellite signals.

16. The method of claim 9, wherein said first receiver is a GPS receiver and said first receiver generates position correction information by comparison of timing information derived from a specified position of an antenna of said first receiver to separate timing information derived by said first receiver from GPS satellite signals.

17. An irrigation system, comprising:

a plurality of semi-rigidly connected sections forming a boom, said sections align-ably position-able by a plurality of reversible motors, a first receiver at a first fixed position with respect to a central tower of said system for generating position correction signals; and a second receiver mounted at a selectable second position on said system at a distance from said central tower for receiving said position correction signals and generating corrected position signals indicative of an extent of misalignment between a plurality of semi-rigidly connected sections of said system.

18. The system of claim 17, wherein a failure of one or more of said motors is determinable from said position signals indicative of an extent of misalignment.

19. The system of claim 17, wherein said position signals are derived from a time-average of information signals averaged over a selectable time interval for minimizing errors in position determinations.

20. The method of claim 17, wherein said first receiver is a GPS receiver and said second receiver is a GPS receiver and said first receiver communicates to said second receiver the identity of satellites from which a position signal is derived by said first receiver to enable said second receiver to use said same satellites from which to derive position signals.

* * * * *